US012782658B2

(12) United States Patent
Kang et al.

(10) Patent No.: US 12,782,658 B2
(45) Date of Patent: Nov. 3, 2026

(54) PACKAGE DEVICE

(71) Applicant: Advanced Semiconductor Engineering, Inc., Kaohsiung (TW)

(72) Inventors: Jung Jui Kang, Kaohsiung (TW); Shih-Yuan Sun, Kaohsiung (TW); Chiu-Wen Lee, Kaohsiung (TW); Chang Chi Lee, Kaohsiung (TW); Chun-Yen Ting, Kaohsiung (TW); Hung-Chun Kuo, Kaohsiung (TW)

(73) Assignee: Advanced Semiconductor Engineering, Inc., Kaohsiung (TW)

( * ) Notice: Subject to any disclaimer, the term of this patent is extended or adjusted under 35 U.S.C. 154(b) by 656 days.

(21) Appl. No.: 18/135,076

(22) Filed: Apr. 14, 2023

(65) Prior Publication Data

US 2024/0345341 A1 Oct. 17, 2024

(51) Int. Cl.
*G02B 6/42* (2006.01)
*G02B 6/43* (2006.01)

(52) U.S. Cl.
CPC ......... *G02B 6/4267* (2013.01); *G02B 6/4257* (2013.01); *G02B 6/43* (2013.01)

(58) Field of Classification Search
CPC ...... G02B 6/4267; G02B 6/4257; G02B 6/43; G02B 6/4274; G02B 6/4202; G02B 6/4249; G02B 6/4269
See application file for complete search history.

(56) References Cited

U.S. PATENT DOCUMENTS

| | | | | |
|---|---|---|---|---|
| 8,022,532 | B2 | 9/2011 | Kasuya et al. | |
| 2023/0088009 | A1* | 3/2023 | Karhade .............. | G02B 6/4256 385/14 |

OTHER PUBLICATIONS

U.S. Appl. No. 17/838,099, filed Jun. 10, 2022, Yen et al.

* cited by examiner

*Primary Examiner* — John Bedtelyon
(74) *Attorney, Agent, or Firm* — Foley & Lardner LLP

(57) ABSTRACT

A package device is provided. The package device includes a first die and a first through via structure. The first die has a first optical I/O. The first through via structure is over the first die. A first region of the first through via structure is configured to dissipate heat from the first die and a second region of the first through via structure is configured to transmit an optical signal to or from the first optical I/O.

10 Claims, 15 Drawing Sheets

1

2

PACKAGE DEVICE

BACKGROUND

1. Field of the Disclosure

The present disclosure relates to a package device and a method of manufacturing a package device.

2. Description of the Related Art

Silicon-photonic (SiPh) devices provide advantages of high transmission speed and low power loss, and thus are applied in various areas. A plurality of photonic integrated circuits share a limited number of optical fibers and thus some photonic integrated circuits have no direct optical transmission with an external system.

SUMMARY

In some embodiments, a package device includes a first die and a first through via structure. The first die has a first optical I/O. The first through via structure is over the first die. A first region of the first through via structure is configured to dissipate heat from the first die and a second region of the first through via structure is configured to transmit an optical signal to or from the first optical I/O.

In some embodiments, a package device includes a first photonic integrated circuit (PIC), a second PIC, an optical interconnect structure, and a first waveguide. The second PIC is adjacent to the first PIC. The optical interconnect structure is over the first PIC and the second PIC. The first waveguide is embedded in the optical interconnect structure. Two end sections of the first waveguide are respectively proximal to the first PIC and the second PIC. A middle section is connected the two end sections and overhangs between the first PIC and the second PIC.

In some embodiments, a package device includes a first integrated circuit (IC), a second IC, and a thermal structure. The second IC is adjacent to the first IC. The thermal structure is over the first IC and the second IC and configured to dissipate heat. The thermal structure includes a first optical structure penetrating through the thermal structure and optically coupled to the first IC; and a second optical structure penetrating through the thermal structure and optically coupled to the second IC.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
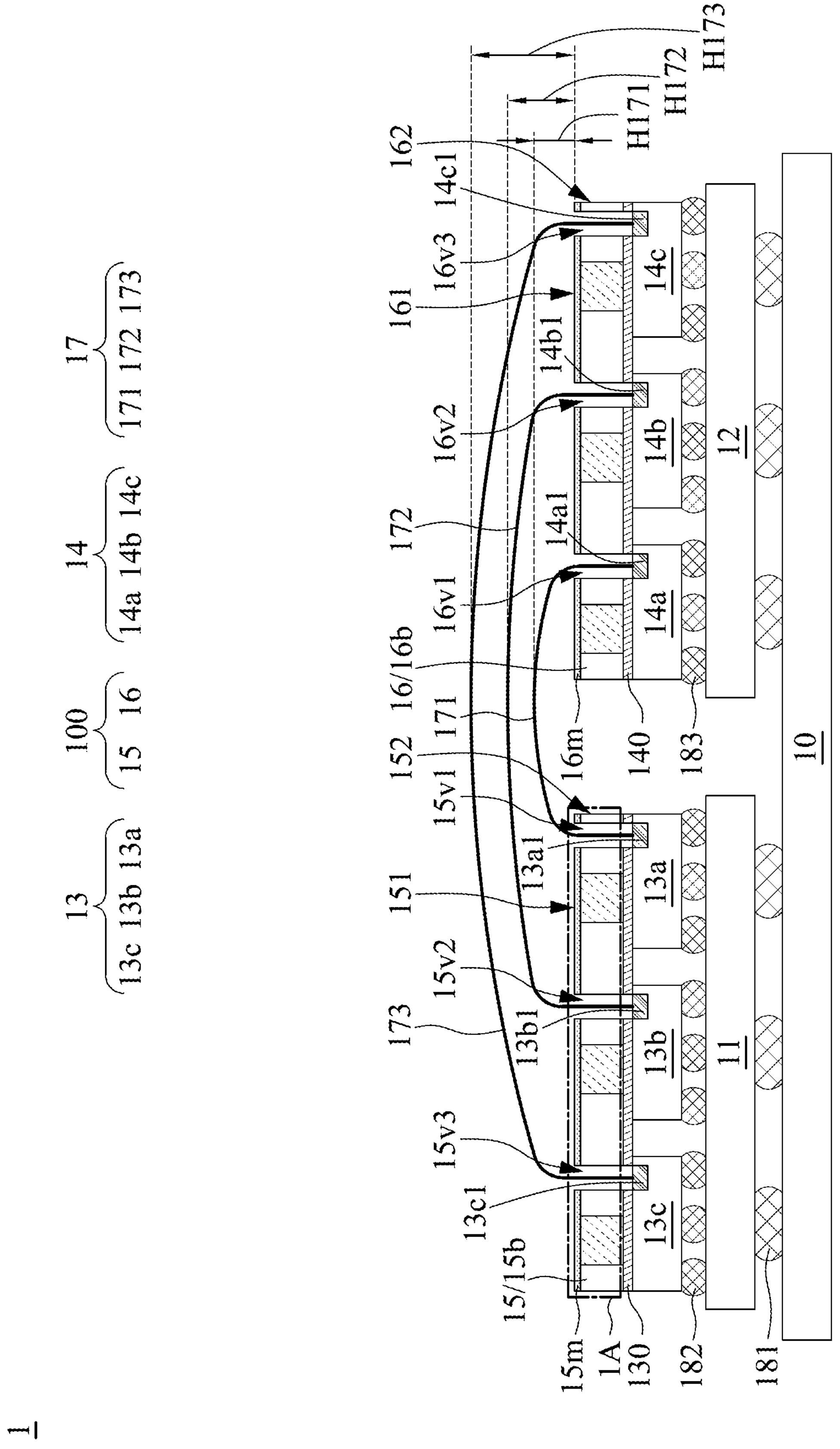
FIG. 1 is a cross section of a package device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a top view of a package device 1 according to some embodiments of the present disclosure. The package device 1 may include a circuit structure 10, a substrate 11, a substrate 12, a plurality of photonic components 13, a plurality of photonic components 14, a through via structure 15, a through via structure 16, a fiber array unit 17, and a plurality of connection elements 181, 182, and 183.

The circuit structure 10 is disposed below the substrate 11 and the substrate 12. In some embodiments, the circuit structure 10 may include an interposer. In some embodiments, the circuit structure 10 may include, for example, a printed circuit board (PCB), such as a paper-based copper foil laminate, a composite copper foil laminate, or a polymer-impregnated glass-fiber-based copper foil laminate. In some embodiments, the circuit structure 10 may include a semiconductor substrate including silicon, germanium, or other suitable materials. The circuit structure 10 may be referred to as a carrier, or substrate.

The substrate (or a carrier) 11 may be disposed over the circuit structure 10. The substrate 11 may be electrically connected to the circuit structure 10 through the connection elements 181. The connection elements 181 may be disposed between the circuit structure 10 and the substrate 11. The connection elements 181 may include solder balls, controlled collapse chip connection (C4) bumps, a ball grid array (BGA), or a land grid array (LGA).

The substrate 11 may include a wiring structure including conductive traces and conductive vias embedded in an insulation layer, and/or conductive pads at the surfaces of the substrate 11. The substrate 11 may include an interposer. In some embodiments, the material of the conductive traces, conductive vias, and the conductive pads may each include one or more metals such as copper (Cu), gold (Au), aluminum (Al), titanium (Ti), or the like. In some embodiments, the material of the insulation layer of the substrate 11 may include pre-impregnated composite fibers (e.g., a pre-preg material). Examples of a pre-preg material may include, but are not limited to, a multilayer structure formed by stacking or laminating a number of pre-impregnated materials (e.g., epoxy resin and glass fiber cloth) or sheets.

The substrate (or a carrier) 12 may be disposed adjacent to the substrate 11. The substrate 12 may be disposed over the circuit structure 10. The substrate 12 may be electrically connected to the circuit structure 10 through the connection elements 181. The connection elements 181 may be disposed between the circuit structure 10 and the substrate 12. The substrate 12 may include a wiring structure including conductive traces and conductive vias embedded in an insulation layer, and/or conductive pads at the surfaces of the substrate 12. The substrate 12 may include an interposer. In some embodiments, the material of the conductive traces, conductive vias, and the conductive pads may each include one or more metals such as copper (Cu), gold (Au), aluminum (Al), titanium (Ti), or the like. In some embodiments, the material of the insulation layer of the substrate 12 may include pre-impregnated composite fibers (e.g., a pre-preg material). Examples of a pre-preg material may include, but are not limited to, a multilayer structure formed by stacking or laminating a number of pre-impregnated materials (e.g., epoxy resin and glass fiber cloth) or sheets.

The photonic components 13 may be disposed below the through via structure 15. The through via structure 15 may fully cover the photonic components 13 from a top view. The photonic components 13 may be disposed over the substrate 11. Each of the photonic components 13 may be supported by the substrate 11. The photonic components 13 may each have a lower surface electrically connected to the substrate 12 through the connection elements 182. The connection elements 182 may be disposed between the substrate 12 and photonic components 13. The connection elements 182 may include solder balls, controlled collapse chip connection (C4) bumps, a ball grid array (BGA), or a land grid array (LGA).

Figure 1A:
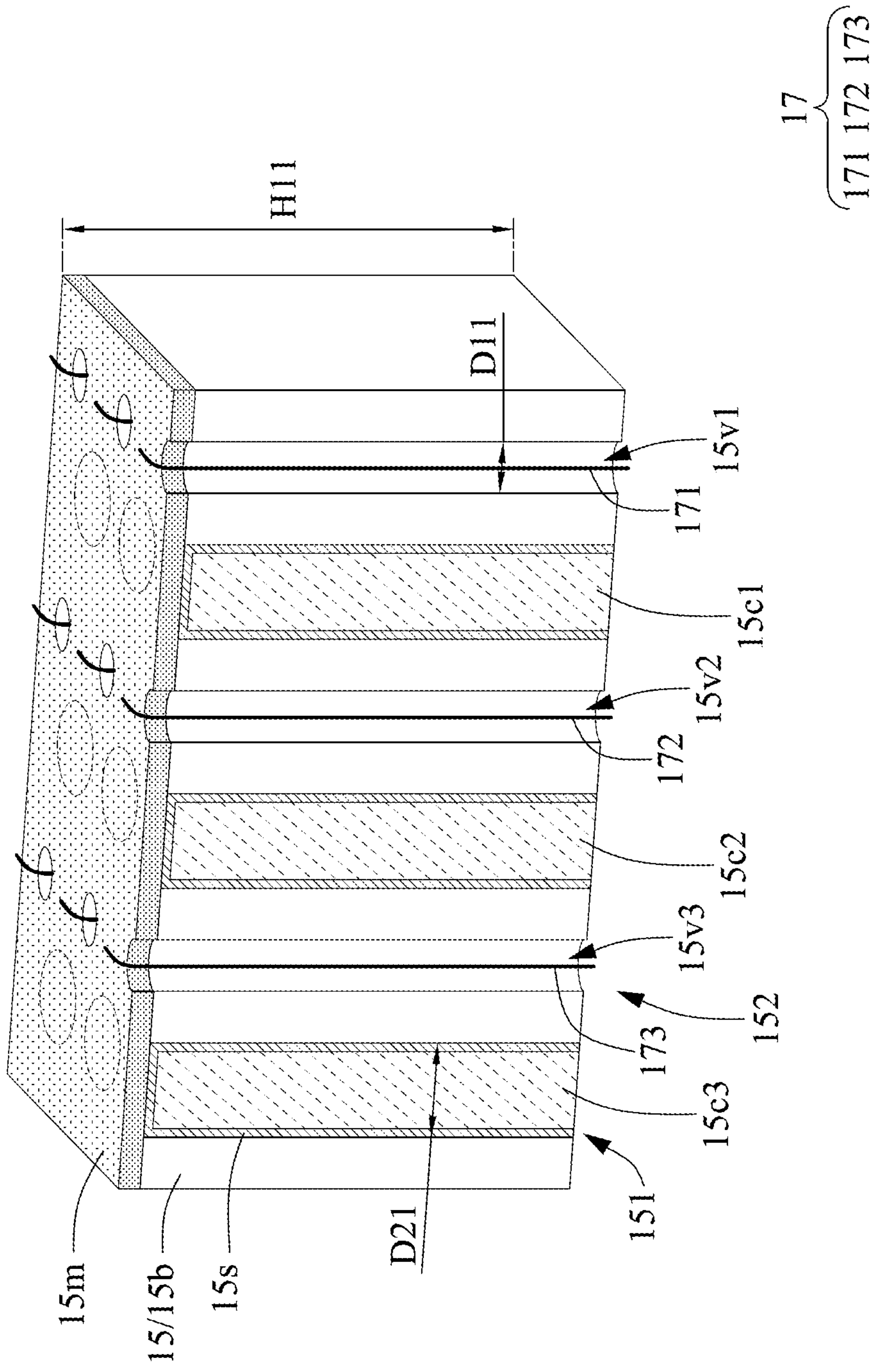
FIG. 1A is a schematic perspective view of a through via structure according to some embodiments of the present disclosure.

The photonic components 13 may be arranged as an array, e.g., 3*3 array, as illustrated in FIG. 1A. The photonic components 13 may include more photonic components arranged in an array, e.g., M*N, wherein M is a positive integer larger and N is a positive integer larger. The photonic components 13 may be configured to receive and process an optical signal and output an electrical signal to the substrate 11. The photonic components 13 may be configured to receive and process an electrical signal and output an optical signal to, for example, the through via structure 15. The photonic components 13 may each include a photonic IC (PIC). The photonic components 13 may each include, for example but not limited to, a waveguide, an electro-optic conversion unit (such as a photodiode or a laser), a beam splitter, a modulator, etc. The photonic components 13 may be referred to as dies or PICs. In some embodiments, the photonic components 13 may each include an electro-optical integrated circuit.

The photonic components 13 may include photonic components **13*a*, 13*b*, and 13*c*. The photonic component 13*c* may be further from the substrate 12 than the photonic component 13*b*. The photonic component 13*b* may be further from the substrate 12 than the photonic component 13*a*. The photonic component 13*a* may include an I/O 13*a*1 at an upper surface facing the through via structure 15. The I/O 13*a*1 may include an optical structure (or a grating structure) transmitting or receiving an optical signal. The photonic component 13*b* may include an I/O 13*b*1 at an upper surface facing the through via structure 15. The I/O 13*b*1 may include a grating structure transmitting or receiving an optical signal. The photonic component 13*c* may include an I/O 13*c*1 at an upper surface facing the through via structure 15. The I/O 13*c*1** may include a grating structure transmitting or receiving an optical signal.

The photonic components 14 may be disposed below the through via structure 16. The through via structure 16 may fully cover the photonic components 14 from a top view. The photonic components 14 may be disposed over the substrate 12. Each of the photonic components 14 may be supported by the substrate 12. The photonic components 14 may have each have a lower surface electrically connected to the substrate 12 through the connection elements 183. The connection elements 183 may be disposed between the substrate 12 and photonic components 14. The connection elements 183 may include solder balls, controlled collapse chip connection (C4) bumps, a ball grid array (BGA), or a land grid array (LGA).

The photonic components 14 may be arranged as an array, e.g., 3*3 array. The photonic components 14 may include more photonic components arranged in an array, e.g., M*N, wherein M is a positive integer larger and N is a positive integer larger. The photonic components 14 may be configured to receive and process an optical signal and output an electrical signal to the substrate 12. The photonic components 14 may be configured to receive and process an electrical signal and output an optical signal to, for example, the through via structure 16. The photonic components 14 may each include a photonic IC (PIC). The photonic components 14 may each include, for example but not limited to, a waveguide, an electro-optic conversion unit (such as a photodiode or a laser), a beam splitter, a modulator, etc. The photonic components 14 may be referred to as dies or PICs. In some embodiments, the photonic components 14 may each include an electro-optical integrated circuit.

The photonic components 14 may include photonic components **14*a*, 14*b*, and 14*c*. The photonic component 14*a* may be adjacent to the photonic component 13*a*. The photonic component 14*c* may be further from the substrate 11 than the photonic component 14*b*. The photonic component 14*b* may be further from the substrate 11 than the photonic component 14*a*. The photonic component 14*a* may include an (I/O 14*a*1 at an upper surface facing the through via structure 16. The I/O 14*a*1 may include an optical structure (or a grating structure) transmitting or receiving an optical signal. The photonic component 14*b* may include an I/O 14*b*1 at an upper surface facing the through via structure 16. The I/O 14*b*1 may include a grating structure transmitting or receiving an optical signal. The photonic component 14*c* may include an optical I/O 14*c*1 at an upper surface facing the through via structure 16. The optical I/O 14*c*1** may include a grating structure transmitting or receiving an optical signal.

The through via structure 15 and the through via structure 16 may be included in an optical interconnect structure 100. The optical interconnect structure 100 may be disposed over the photonic components 13 and 14. The optical interconnect structure 100 may be configured to dissipate heat from photonic components 13 and 14 and transmit an optical signal to or from the photonic components 13 and 14.

The through via structure 15 may be disposed over the photonic components 13. The through via structure 15 may be thermally connected with the photonic component 13. The through via structure 15 may be attached to the photonic components 13 through a thermal interface material 130, which is used to dissipate and improve the transfer of heat out of the photonic components 13. The thermal interface material 130 may electrically isolate the photonic components 13 from the through via structure 15. In some embodiments, the thermal interface material 130 may include an adhesive material.

The through via structure 15 may include a body portion **15*b*. The body portion 15*b* may include silicon or other suitable materials. The through via structure 15 may be thermally connected with the photonic component 13. The through via structure 15 may include a region 151 configured to dissipate heat from the photonic components 13 and a region 152 configured to transmit an optical signal to or from the optical I/Os 13*a*1, 13*b*1, and/or 13*c*1. The region 152 may be interlaced with the region 151 from a top view. FIG. 1A is a schematic perspective view of a through via structure (e.g., the through via structure 15**) according to some embodiments of the present disclosure.

As shown in FIG. 1A, the region 151 may extend between an upper surface and a lower surface of the body portion **15*b* of the through via structure 15. The region 151 may be filled with material with a heat transfer coefficient exceeding that of the body portion 15*b* (e.g., silicon). The region 151 may include a plurality of through vias (or through silicon vias) 15*c*1, 15*c*2, and 15*c*3 penetrating the body portion 15*b*. The through vias 15*c*1, 15*c*2, and 15*c*3 of the region 151 may be a type of through via configured to dissipate heat, e.g., from the photonic components 13*a*, 13*b*, and 13*c*. The through vias 15*c*1, 15*c*2, and 15*c*3 of the region 151 may be filled with material with a heat transfer coefficient exceeding that of the body portion 15*b* of the through via structure 15 (e.g., silicon). The through vias 15*c*1, 15*c*2, and 15*c*3 may dissipate the heat from the photonic components 13 at a higher heat transfer rate, e.g., than the body portion 15*b*. The through vias 15*c*1, 15*c*2, and 15*c*3 may be cylindrical. Each of the through vias 15*c*1, 15*c*2, and 15*c*3 of the region 151 may include a seed layer 15*s* and an electroplated layer. The seed layer 15*s* may be disposed at an inner wall of the through vias 15*c*1, 15*c*2, and 15*c*3. In some embodiments, the through vias 15*c*1, 15*c*2, and 15*c*3** may include one or more metal, such as copper (Cu), gold (Au), aluminum (Al), titanium (Ti), or the like.

A heat spreader **15*m* may be disposed over the through via structure 15. The heat spreader 15*m* may be thermally coupled to the region 151 of the through via structure 15. The through vias 15*c*1, 15*c*2, and 15*c*3 may be covered by the heat spreader 15*m* as depicted with dashed circles. The through vias 15*c*1, 15*c*2, and 15*c*3 of the region 151 may contact the heat spreader 15*m*, such that the heat from the photonic components 13 may be transferred to the heat spreader 15*m*. The heat spreader 15*m* may include a heat dissipation layer having high thermal conductivity. The heat dissipation layer 15*m* may be thermally coupled to at least one of the photonic components 13 through the through via structure 15. The heat spreader 15*m* may cover the upper surface of the through via structure 15 and thus present a large cross section to increase heat transfer. The heat spreader 15*m*** may include solid conductors like copper, aluminum, or diamond or may be heat pipes and vapor chambers.

As shown in FIG. 1A, the region 152 may extend between the upper surface and the lower surface of the body portion **15*b* of the through via structure 15. The region 152 may include a plurality of through vias (or through silicon vias, or through openings, or optical structures) 15*v*1, 15*v*2, and 15*v*3. The through vias 15*v*1, 15*v*2, and/or 15*v*3 may penetrate the through via structure (or a thermal structure) 15 and may be optically coupled to at least one of the photonic components 13 (as shown in FIG. 1). The through vias 15*v*1, 15*v*2, and 15*v*3 may penetrate the body portion 15*b*. The through vias 15*v*1, 15*v*2, and 15*v*3 may penetrate the heat spreader 15*m* to form a plurality of holes therein. The through vias 15*v*1, 15*v*2, and 15*v*3 (dashed circles in FIG. 1A) of the region 152 may be interlaced with the through vias 15*c*1, 15*c*2, and 15*c*3 of the region 151 from a top view. Referring back to FIG. 1A, the through vias 15*v*1, 15*v*2, and 15*v*3 may respectively align with the optical I/Os 13*a*1, 13*b*1, and 13*c*1. The through vias 15*v*1, 15*v*2, and 15*v*3 may respectively expose the optical I/Os 13*a*1, 13*b*1, and 13*c*1. The optical I/Os 13*a*1, 13*b*1, and 13*c*1 may be disposed below the through vias 15*v*1, 15*v*2, and 15*v*3**.

As shown in FIG. 1A, the through vias **15*v*1, 15*v*2, and 15*v*3 may be cylindrical. The through vias 15*v*1, 15*v*2, and 15*v*3 may have a diameter D11 of from about 5 μm to about 10 μm. A diameter D21 of the through vias 15*c*1, 15*c*2, and 15*c*3 may exceed the diameter D11. The through vias 15*v*1, 15*v*2, and 15*v*3 may have a height H11** of from about 50 μm to about 100 μm.

The fiber array unit 17 may include optical fibers (or optical structures) 171, 172, and 173. The optical fibers 171, 172, and 173 may include a single mode, multimode fiber, or a photonic bonding wire with a width of around 1 μm to around 2 μm. The region 152 of the through via structure 15 is configured to accommodate an optical transmissive material, i.e., at least one of the optical fibers 171, 172, and 173 of the fiber array unit 17. The optical fiber 171 (or an end thereof) may be disposed in the through via **15*v*1 of the region 152 and may be free from contacting an inner wall of the through via 15*v*1. In some embodiments, the optical fiber 171 may contact the inner wall of the through via 15*v*1. The optical fiber 172 (or an end thereof) may be disposed in the through via 15*v*2 of the region 152 and may be free from contacting an inner wall of the through via 15*v*2. In some embodiments, the optical fiber 172 may contact the inner wall of the through via 15*v*2. The optical fiber 173 (or an end thereof) may be disposed in the through via 15*v*3 of the region 152 and may be free from contacting an inner wall of the through via 15*v*3. In some embodiments, the optical fiber 173 may contact the inner wall of the through via 15*v*3**.

Referring back to FIG. 1, the through via structure 16 may be disposed over the photonic components 14. The through via structure 16 may be thermally connected with the photonic component 14. The through via structure 16 may be attached to the photonic components 14 through a thermal interface material 140, which is used to dissipate and improve the transfer of heat out of the photonic components 14. The thermal interface material 140 may electrically isolate the photonic components 14 from the through via structure 16. In some embodiments, the thermal interface material 140 may include an adhesive material.

The through via structure 16 may include a body portion **16*b*. The body portion 16*b* may include silicon or other suitable materials. The through via structure 16 may include a region 161 configured to dissipate heat from the photonic components 14 and a region 162 configured to transmit an optical signal to or from the optical I/Os 14*a*1, 14*b*1, and/or 14*c*1. The region 162 may be interlaced with the region 161. The region 161 of the through via structure 16 may be similar to the region 151 of the through via structure 15 as illustrated in FIG. 1A. In particular, the region 161 may be filled with a material with a heat transfer coefficient exceeding that of the body portion 16***b* of the through via structure 16 (e.g., silicon). The region 161 of the through via structure 16 may include a plurality of through vias configured to dissipate heat from the photonic components 14*a*, 14*b*, and 14*c*. The through vias of the region 161 may include a seed layer and an electroplated layer. The seed layer may be disposed at an inner wall of the through vias of the region 161.

A heat spreader 16*m* may be disposed over the through via structure 16. The through vias 16*c*1, 16*c*2, and 16*c*3 of the region 161 may contact the heat spreader 16*m*, such that the heat from the photonic components 14 may be transferred to the heat spreader 16*m*. The heat spreader 16*m* may include a heat dissipation layer having high thermal conductivity. The heat dissipation layer 16*m* may be thermally coupled to at least one of the photonic components 14 through the through via structure 16. The heat spreader 16*m* may cover the upper surface of the through via structure 16 and thus present a large cross section to increase heat transfer. The heat spreader 16*m* may include solid conductors like copper, aluminum, or diamond, or may be heat pipes and vapor chambers.

As shown in FIG. 1, the region 162 may extend between the upper surface and the lower surface of the body portion 16*b* of the through via structure 16. The region 162 may include a plurality of through vias (or through silicon vias, or through openings, or optical structures) 16*v*1, 16*v*2, and 16*v*3. The through vias 16*v*1, 16*v*2, and/or 16*v*3 may penetrate the through via structure (or a thermal structure) 16 and optically coupled to at least one of the photonic components 14. The through vias 16*v*1, 16*v*2, and 16*v*3 may penetrate the body portion 16*b*. The through vias 16*v*1, 16*v*2, and 16*v*3 may penetrate the heat spreader 16*m* to form a plurality of holes therein. The through vias 16*v*1, 16*v*2, and 16*v*3 of the region 162 may be interlaced with the through vias 16*c*1, 16*c*2, and 16*c*3 of the region 161. The through vias 16*v*1, 16*v*2, and 16*v*3 may respectively align with the optical I/Os 14*a*1, 14*b*1, and 14*c*1. The through vias 16*v*1, 16*v*2, and 16*v*3 may respectively expose the optical I/Os 14*a*1, 14*b*1, and 14*c*1. The optical I/Os 14*a*1, 14*b*1, and 14*c*1 may be disposed below the through vias 16*v*1, 16*v*2, and 16*v*3.

The region 162 of the through via structure 16 is configured to accommodate an optical transmissive material, i.e., at least one of the optical fibers 171, 172, and 173 of the fiber array unit 17. The optical fiber 171 (or an end thereof) may be disposed in the through via 16*v*1 of the region 162 and may be free from contacting an inner wall of the through via 16*v*1. In some embodiments, the optical fiber 171 may contact the inner wall of the through via 16*v*1. The optical fiber 172 (or an end thereof) may be disposed in the through via 16*v*2 of the region 162 and may be free from contacting an inner wall of the through via 16*v*2. In some embodiments, the optical fiber 172 may contact the inner wall of the through via 16*v*2. The optical fiber 173 (or an end thereof) may be disposed in the through via 16*v*3 of the region 162 and may be free from contacting an inner wall of the through via 16*v*3. In some embodiments, the optical fiber 173 may contact the inner wall of the through via 16*v*3.

The fiber array unit 17 may be configured to optically couple the photonic components 13 through the region 152 of the through via structure 15. The optical fibers (or optical structures) 171, 172, and 173 may penetrate through the through via structure 15 and may be optically coupled to the photonic components 13*a*, 13*b*, and 13*c*, respectively. A plurality of optical paths between the photonic components 13 and an external device may be established in the region 152. The fiber array unit 17 may be configured to optically couple the photonic components 14 through the region 162 of the through via structure 16. The optical fibers (or optical structures) 171, 172, and 173 may penetrate through the through via structure 16 and may be optically coupled to the photonic components 14*a*, 14*b*, and 14*c*, respectively. A plurality of optical paths between the photonic components 14 and an external device may be established in the region 162. Furthermore, the photonic components 13 may be configured to optically communicate with the photonic components 14 through the fiber array unit 17 and the through via structures 15 and 16.

In some embodiments, the region 152 of the through via structure 15 is configured to guide an optical signal and couple to the optical I/O 13*a*1 of the photonic component 13*a*. The region 162 of the through via structure 16 is configured to guide an optical signal and couple to the optical I/O 14*a*1 of the photonic component 14*a*. One end of the optical fiber 171 is optically coupled to the optical I/O 13*a*1, and the opposite end of the optical fiber 171 is optically coupled to the optical I/O 14*a*1.

The region 152 of the through via structure 15 is configured to guide an optical signal and couple to the optical I/O 13*b*1 of the photonic component 13*b*. The region 162 of the through via structure 16 is configured to guide an optical signal and couple to the optical I/O 14*b*1 of the photonic component 14*b*. One end of the optical fiber 172 is optically coupled to the optical I/O 13*b*1, and the opposite end of the optical fiber 172 is optically coupled to the optical I/O 14*b*1.

The region 152 of the through via structure 15 is configured to guide an optical signal and couple to the optical I/O 13*c*1 of the photonic component 13*c*. The region 162 of the through via structure 16 is configured to guide an optical signal and couple to the optical I/O 14*c*1 of the photonic component 14*c*. One end of the optical fiber 173 is optically coupled to the optical I/O 13*c*1, and the opposite end of the optical fiber 173 is optically coupled to the optical I/O 14*c*1.

In some cases, a plurality of PICs covered by a bulky heat spreader share a limited number of optical fibers. These optical fibers may be disposed at an edge of the PICs but distant from a majority of the PICs. These PICs have no direct optical transmission with an external system and the optical signals thereof have to be transmitted to the optical fibers with at least one electro-optic conversion performed by the intervening PICs. This can decrease transmission speed and increase power loss. In the present disclosure, the through via structures 15 or 16 have the heat dissipation region 151 (or 161) and the optical transmission region 152 (or 162) which accommodates the fiber array unit 17. As such, the through via structure 15 (or 16) with the region 151 (or 161) of relatively great heat transfer coefficient can efficiently dissipate the heat from the package device 1 (or the photonic components 13 and 14). Each of the photonic components 13 (or 14) has a direct optical transmission path defined by the region 152 (or 162) of the through via structure 15 (or 16). The transmission speed and the power consumption can be improved and the heat transfer rate can be comparable to a bulky heat spreader.

In some embodiments, the region 152 (or 162) may define a plurality of through vias for each of the photonic components 13 (or 14). Each of the photonic components 13 (or 14) may optically couple to a plurality of optical fibers disposed in the through vias of the region 152 (or 162). The region 151 (or 161) may define a plurality of through vias for each of the photonic components 13 (or 14). Each of the photonic components 13 (or 14) may be thermally connected to the plurality of through vias of the region 151 (or 161).

The optical fiber 171 may have a loop height H171. The optical fiber 172 may have a loop height H172. The optical fiber 173 may have a loop height H173. The loop height H171 may be lower than the loop height H172. The loop height H172 may be less than the loop height H173. The adjacent photonic components 13*a* and 14*a* may be optically connected through the optical fiber 171 with the lower loop height H171. The non-adjacent photonic component 13*b* and 14*b* (or the photonic component 13*c* and 14*c*) may be optically connected through the optical fiber 172 (or 173) with the higher loop height H172 (or H173). The optical fibers 171, 172, and 173 are distant from each other, such that the optical signal transmitted therebetween would not interfere with each other. In other words, the optical fibers 171, 172, and 173 may be optically isolated from each other.

In some embodiments, the photonic components 13 may include a PIC and an electrical integrated circuit (EIC) arranged side-by-side. The PIC of one photonic component 13 may substantially align with the region 152. In some embodiments, the photonic components 14 may include a PIC and an electrical integrated circuit (EIC) arranged side-by-side. The PIC of one photonic component 14 may substantially align with the region 162.

Figure 1B:
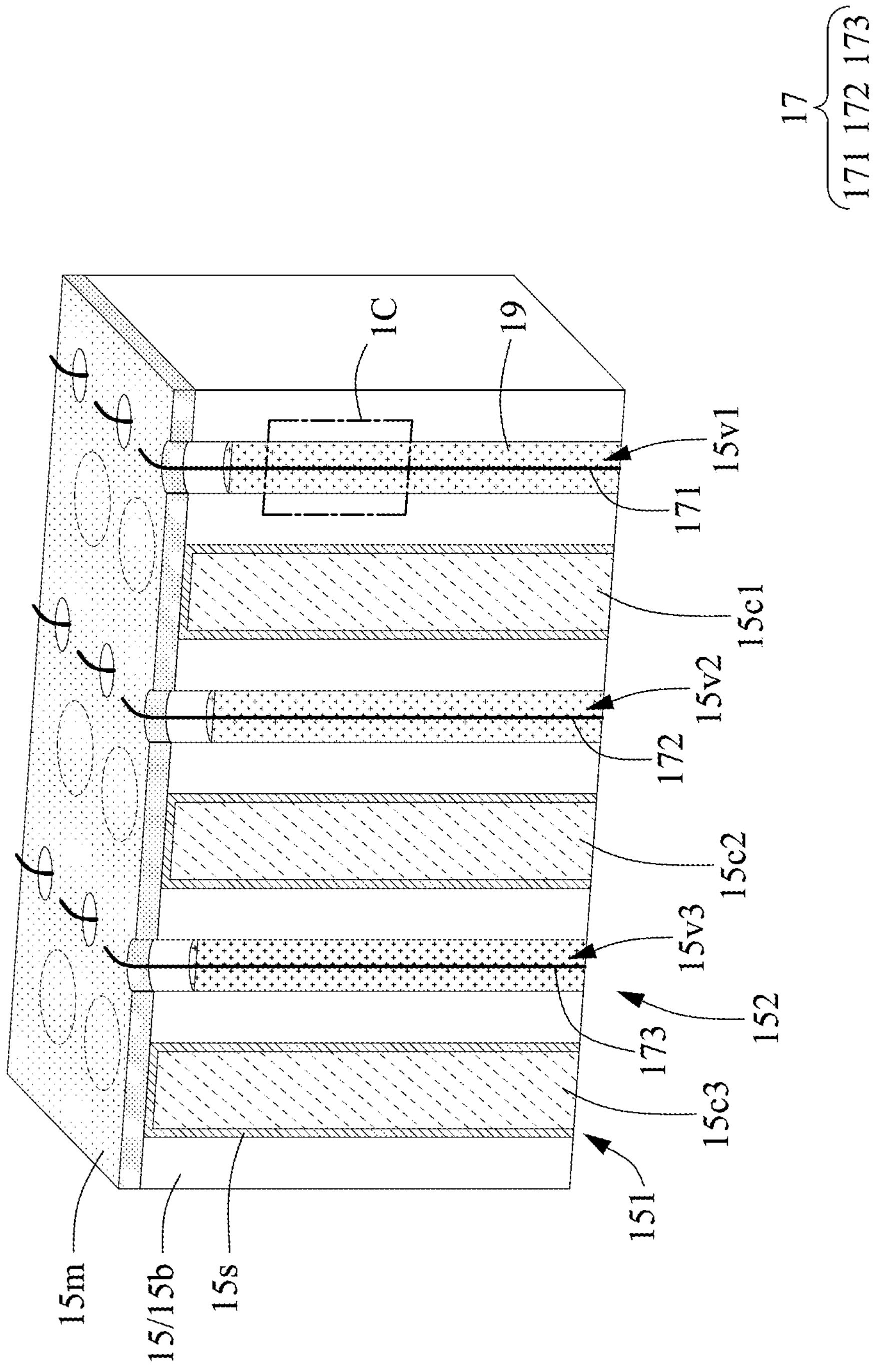
FIG. 1B is a schematic perspective view of a through via structure according to some embodiments of the present disclosure.

FIG. 1B is a schematic perspective view of a through via structure (e.g., the through via structure 15) according to some embodiments of the present disclosure. FIG. 1B is similar to FIG. 1A. Therefore, some detailed descriptions may refer to corresponding preceding paragraphs and are not repeated hereinafter for conciseness, with differences therebetween as follows.

A filler 19 may be disposed in the through vias 15*v*1, 15*v*2, and 15*v*3 of the through via structure 15. The filler 19 may fill a space between at least one of the optical fibers 171, 172, and 173 and the through via structure 15. The filler 19 may have a lower refractive index than that of the optical fibers 171, 172, and 173, such that the filler 19 functions as a cladding layer. The filler 19 may be used to fasten or secure the optical fibers 171, 172, and 173 to prevent location offset of the optical fibers 171, 172, and 173.

The filler 19 may include an epoxy resin, a molding compound (e.g., an epoxy molding compound or other molding compound), polyimide, a phenolic compound or material, a material including silicone dispersed therein, or a combination thereof.

Figure 1C:
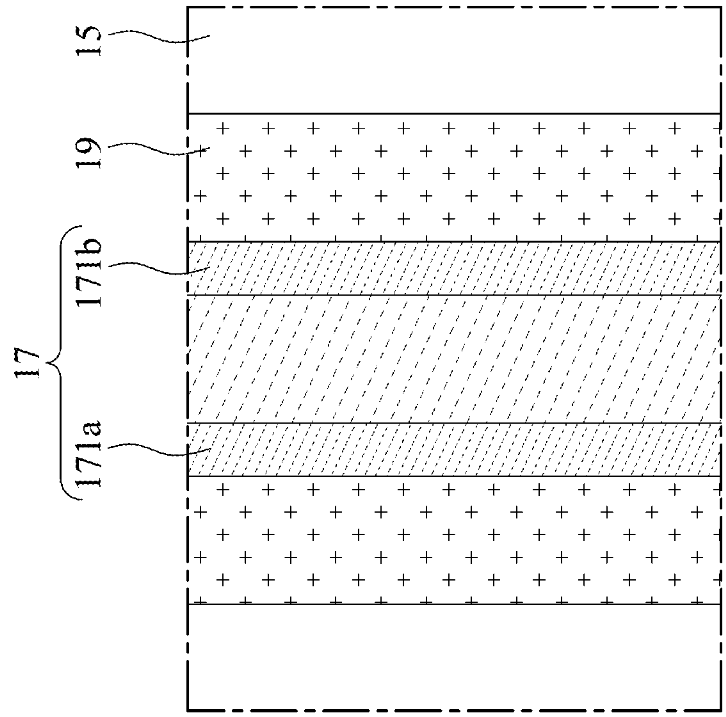
FIG. 1C is an enlarged view of a portion of a through via structure according to some embodiments of the present disclosure.

FIG. 1C is an enlarged view of a portion of a through via structure (e.g., the through via structure 15) according to some embodiments of the present disclosure. FIG. 1C may be an enlarged view of the box 1C in FIG. 1B.

As shown in FIG. 1C, the optical fiber 171 may include a photonic bonding wire which has a core layer 171*a* with a first refractive index and a cladding layer 171*b* with a second refractive index different from the first refractive index. The second refractive index may be lower than the first refractive index. The first refractive index of the core layer 171*a* may be around 1.57 at 1550 nm. The core layer 171*a* may be composed of SU-8 photoresist. The second refractive index of the cladding layer 171*b* may be around 1.30 at 1550 nm. The optical fiber 171 may be formed in a patterning process. The optical fiber 171 may be formed in a three-dimensional printing process.

FIGS. 2A, 2B, 2C, 2D, 2E, 2F, 2G, and 2H illustrate various operations in a method of manufacturing a package device (e.g., the package device 1) in accordance with some embodiments of the present disclosure.

Figure 2A:
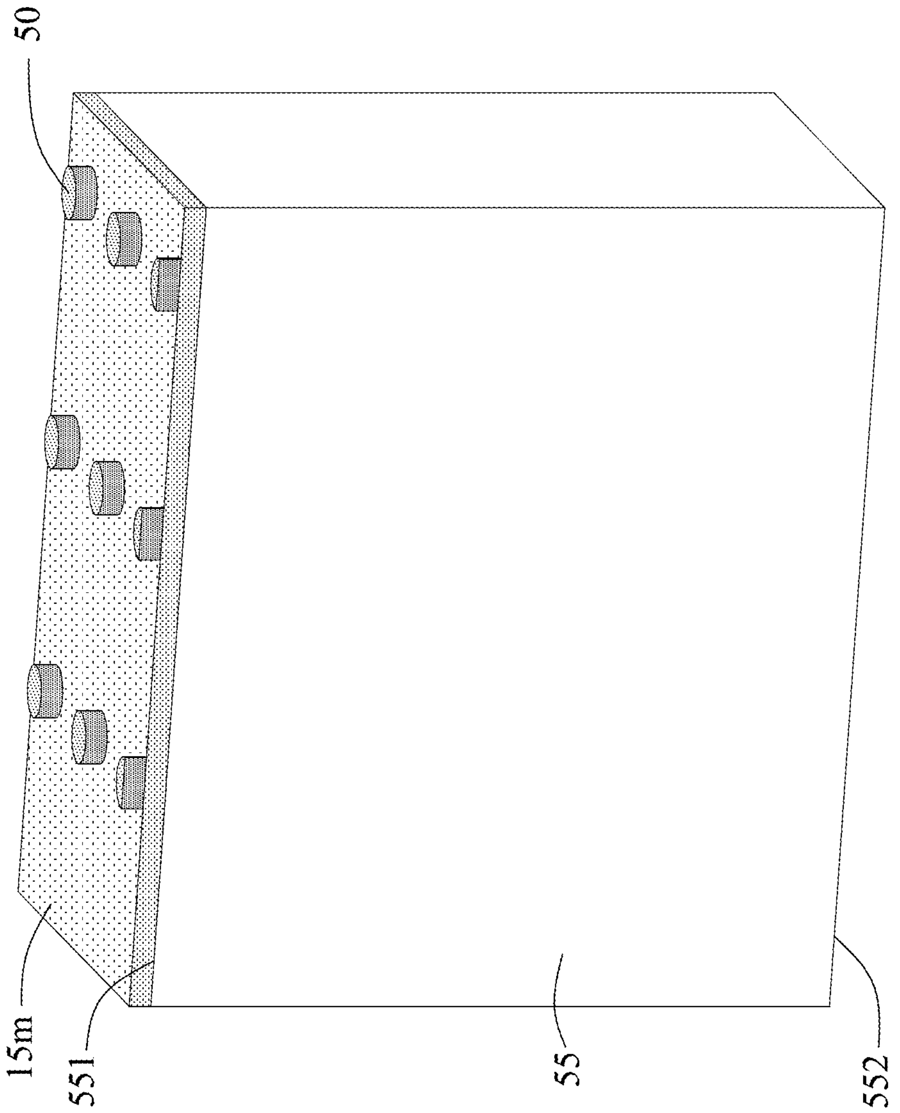
FIGS. 2A, 2B, 2C, 2D, 2E, 2F, 2G, and 2H illustrate various operations in a method of manufacturing a package device in accordance with some embodiments of the present disclosure.

In FIG. 2A, a material 55 may be provided. The material 55 may include semiconductor material, such as, silicon. A heat spreader 15*m* may be formed over an upper surface 551 of the material 55. A photoresist 50 may be formed and patterned into a plurality of sub-regions over the heat spreader 15*m*.

Figure 2B:
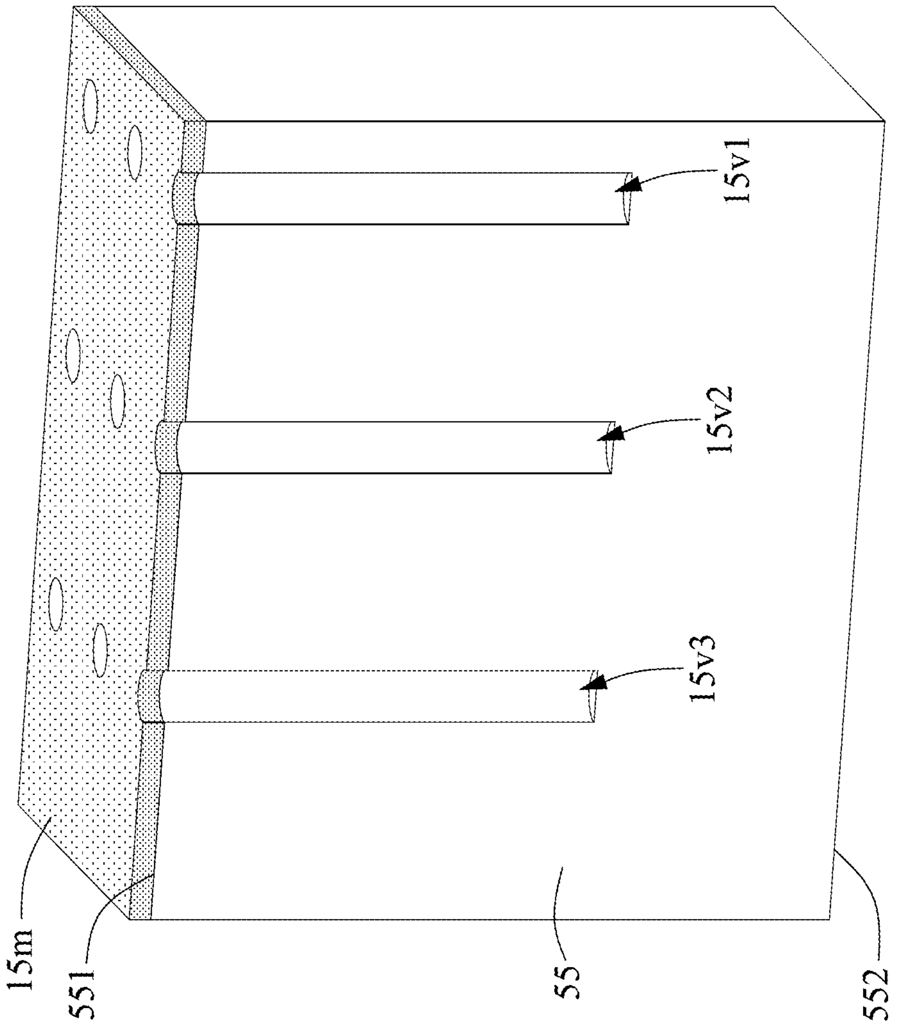

In FIG. 2B, the material 55 may be etched to form a plurality of through vias 15*v*1, 15*v*2, and 15*v*3. The heat spreader 15*m* may be etched to form a plurality of holes.

Figure 2C:
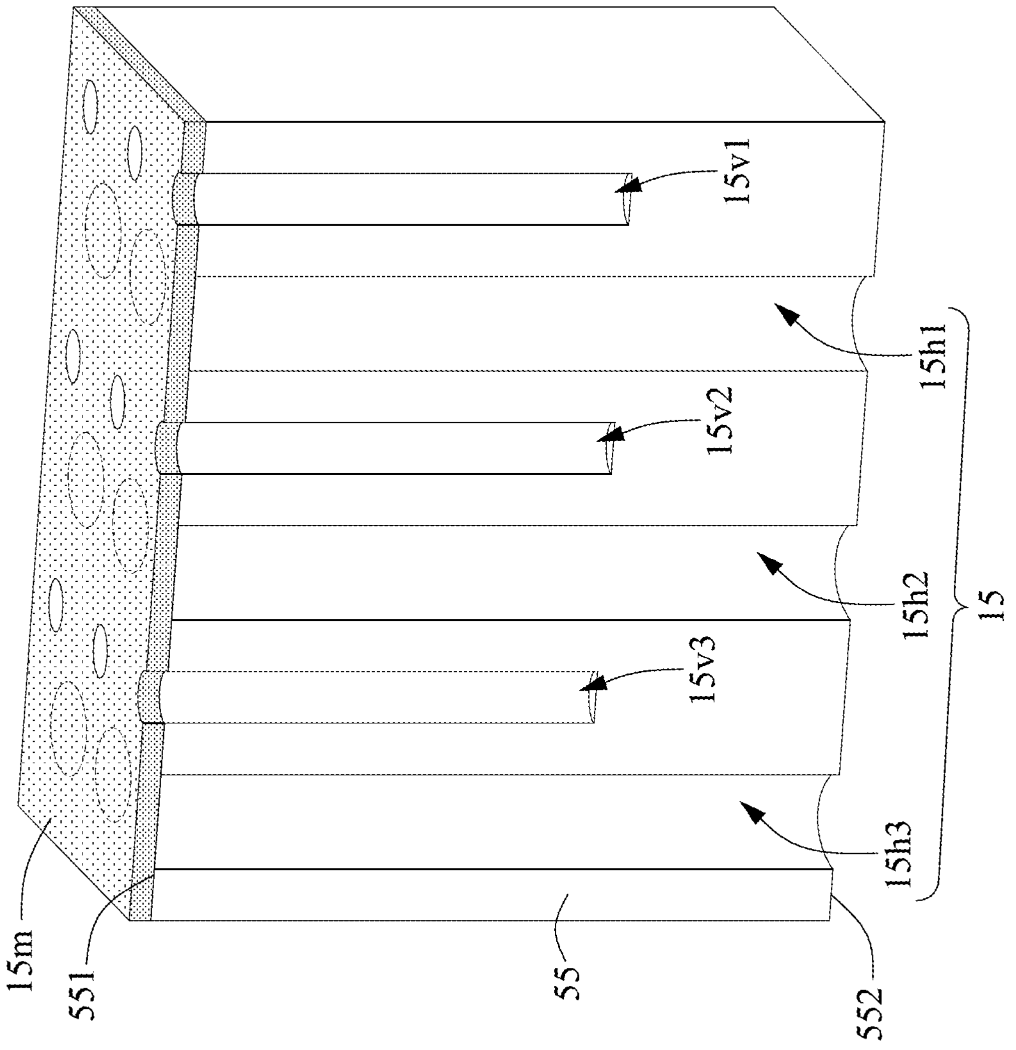

In FIG. 2C, the material 55 may be etched through a lower surface 552 thereof to form a plurality of openings 15*h*1, 15*h*2, and 15*h*3. The heat spreader 15*m* may be a stop layer. The openings 15*h*1, 15*h*2, and 15*h*3 may be depicted as dashed circles since they are covered by the heat spreader 15*m*. The openings 15*h*1, 15*h*2, and 15*h*3 may be interlaced with the through vias 16*v*1, 16*v*2, and 16*v*3 from a top view. The openings 15*h*1, 15*h*2, and 15*h*3 may penetrate the material 55.

Figure 2D:
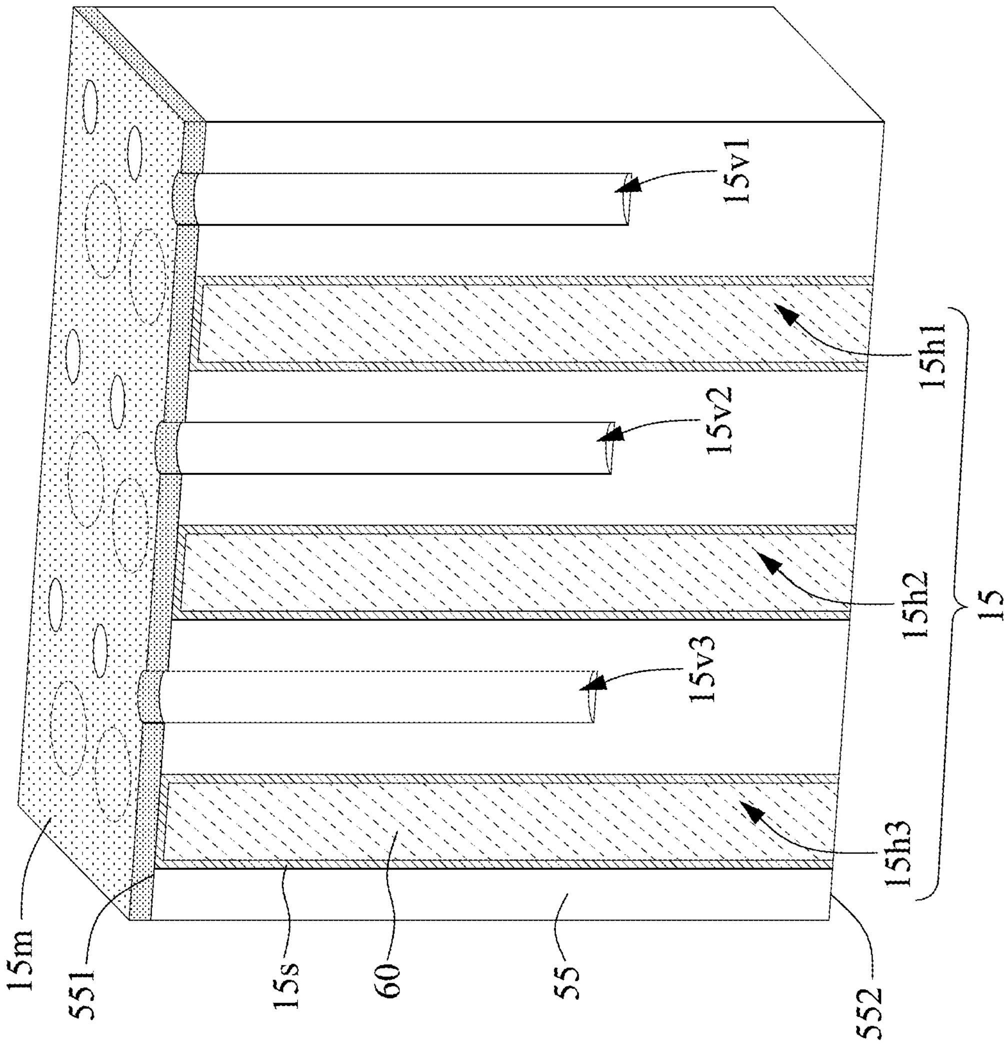

In FIG. 2D, a seed layer 15*s* may be formed along an inner wall of the openings 15*h*1, 15*h*2, 15*h*3 by, for example, a sputtering process. The seed layer 15*s* may be formed of, for example, copper (Cu), tin (Sn), stainless steel, another metal or metal alloy, or a combination thereof. Afterwards, a conductive material 60 may be formed in the openings 15*h*1, 15*h*2, 15*h*3 by, for example, an electroplating process. The conductive material 60 may have a heat transfer coefficient exceeding that of the material 55 (e.g., silicon).

Figure 2E:
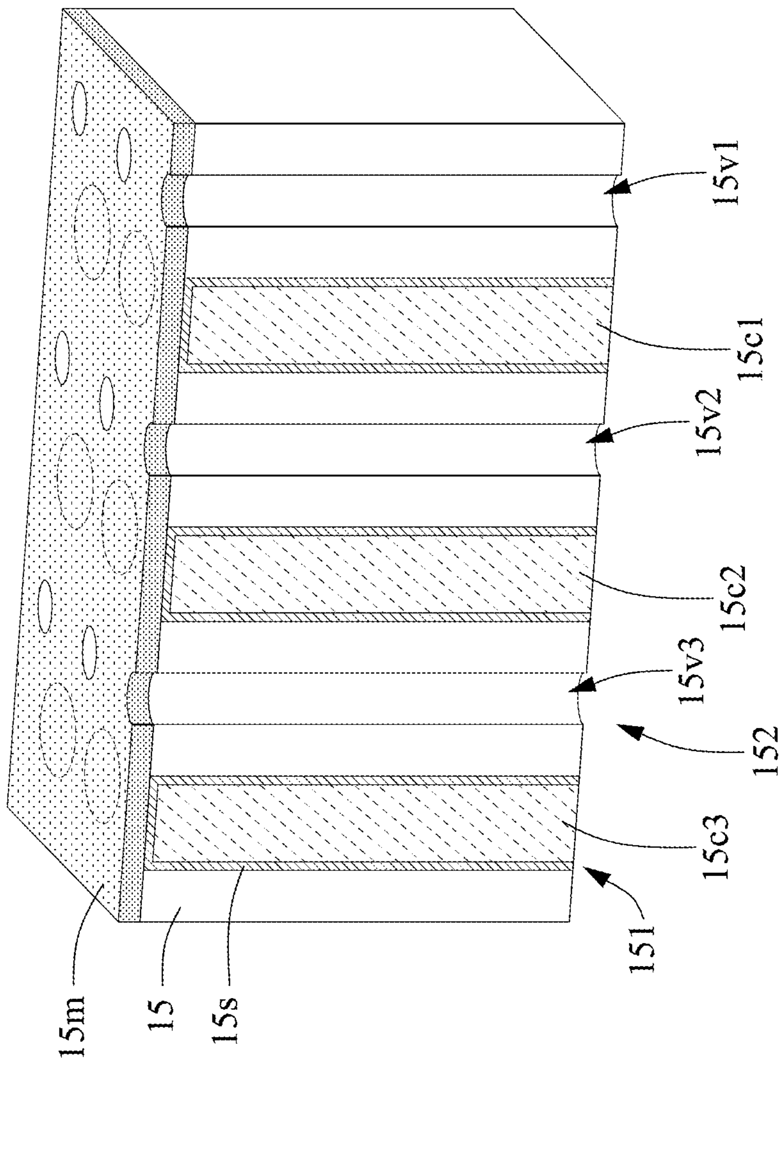

In FIG. 2E, the material 55 may be ground through the lower surface 552 to form a through via structure 15. In particular, the material 55 may be ground to expose the through vias 15*v*1, 15*v*2, and 15*v*3. The material 55, the conductive material 60, and the seed layer 15*s* may be ground to form a plurality of through vias 15*c*1, 15*c*2, and 15*c*3. The through vias 15*c*1, 15*c*2, and 15*c*3 may define a region 151 of the through via structure 15 configured to dissipate heat. The through vias 15*v*1, 15*v*2, and 15*v*3 may define a region 152 of the through via structure 15 configured to transmit an optical signal. The region 151 may be interlaced with the region 152.

Figure 2F:
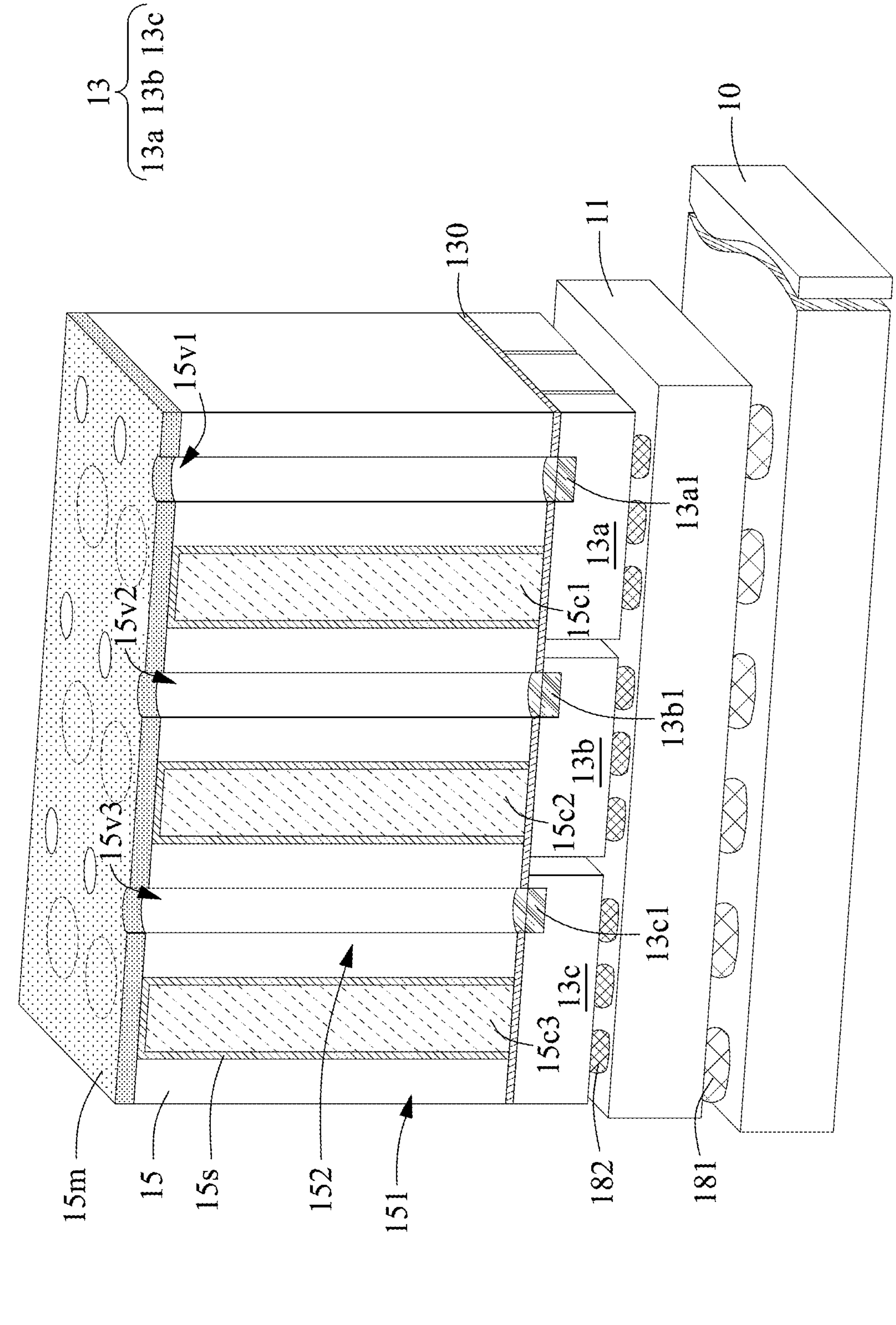

In FIG. 2F, a circuit structure 10 may be provided. A substrate 11 may be attached to the circuit structure 10 through a plurality of connection elements 181. A plurality of photonic components 13 may be attached to the substrate 11 through a plurality of connection elements 182. The through via structure 15 may be attached to the plurality of photonic components 13 through a thermal interface material 130. The through via structure (or a thermal structure) 15 may fully cover the photonic components 13 from a top view. The photonic components 13 may include photonic components 13*a*, 13*b*, and 13*c* corresponding to one of the through vias 15*c*1, 15*c*2, and 15*c*3. The photonic components 13*a*, 13*b*, and 13*c* may respectively have optical I/Os 13*a*1, 13*b*1, and 13*c*1 substantially aligned with one of the through vias 15*v*1, 15*v*2, and 15*v*3.

Figure 2G:
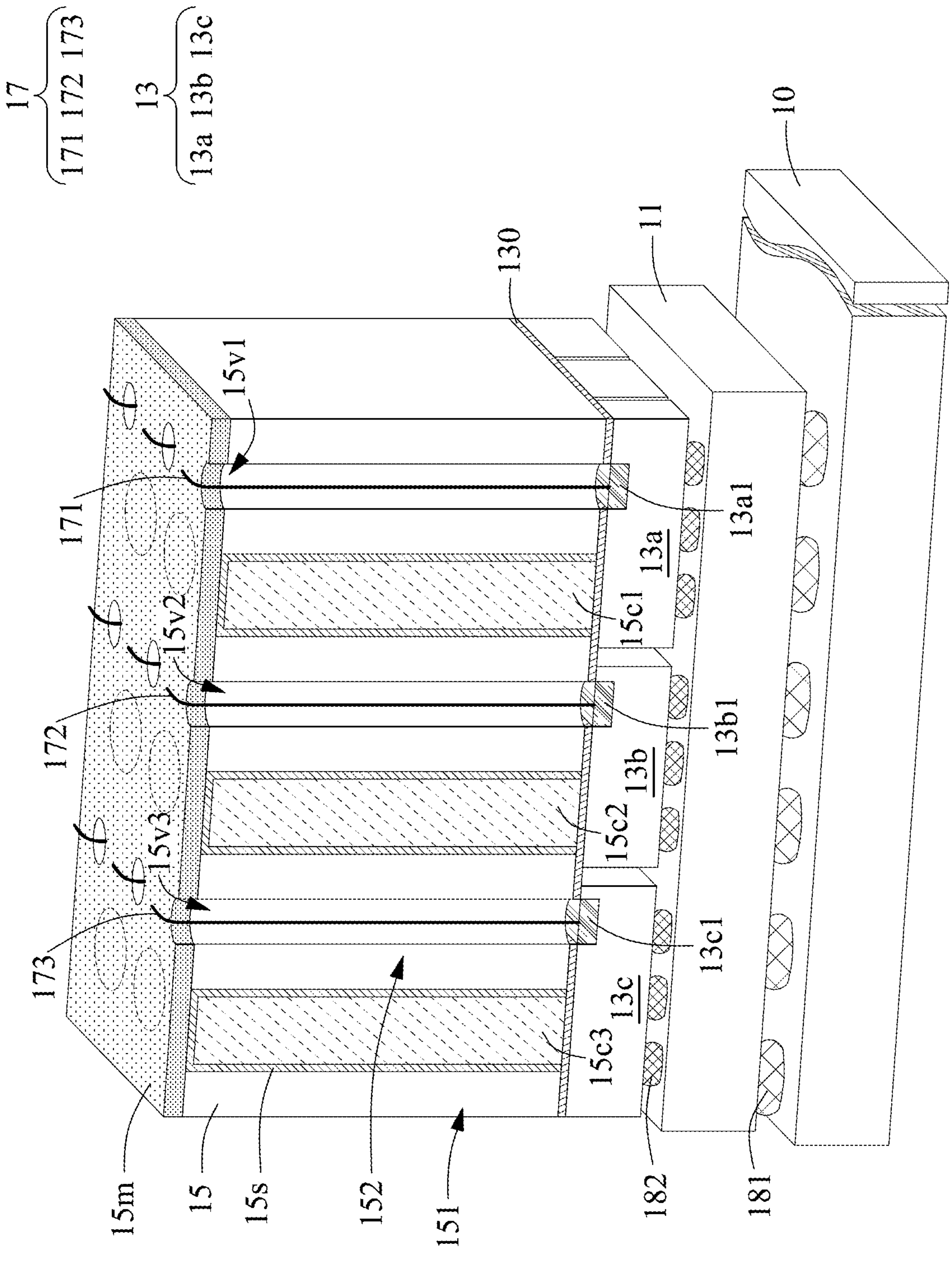

In FIG. 2G, a plurality of optical fibers 171, 172, and 173 of a fiber array unit 17 may be formed in the through vias 15*v*1, 15*v*2, and 15*v*3, respectively, to form a package device 1 as illustrated in FIG. 1. The optical fibers 171, 172, and 173 may be optically coupled with the optical I/Os 13*a*1, 13*b*1, and 13*c*1. The optical fibers 171, 172, and 173 may protrude from the heat spreader 15*m*, such that they can be optically coupled with an external device, system, or a group of photonic components (e.g., the photonic components 14 in FIG. 1).

In the present disclosure, the through via structures 15 have a heat dissipation region 151 and an optical transmission region 152 which accommodate the fiber array unit 17. As such, the through via structure 15 with the region 151 of relatively great heat transfer coefficient can efficiently dissipate the heat from the package device 1. Each of the photonic components 13 has a direct optical transmission path defined by the region 152 the through via structure 15. The transmission speed and the power consumption can be improved and the heat transfer rate can be comparable to a bulky heat spreader.

Figure 2H:
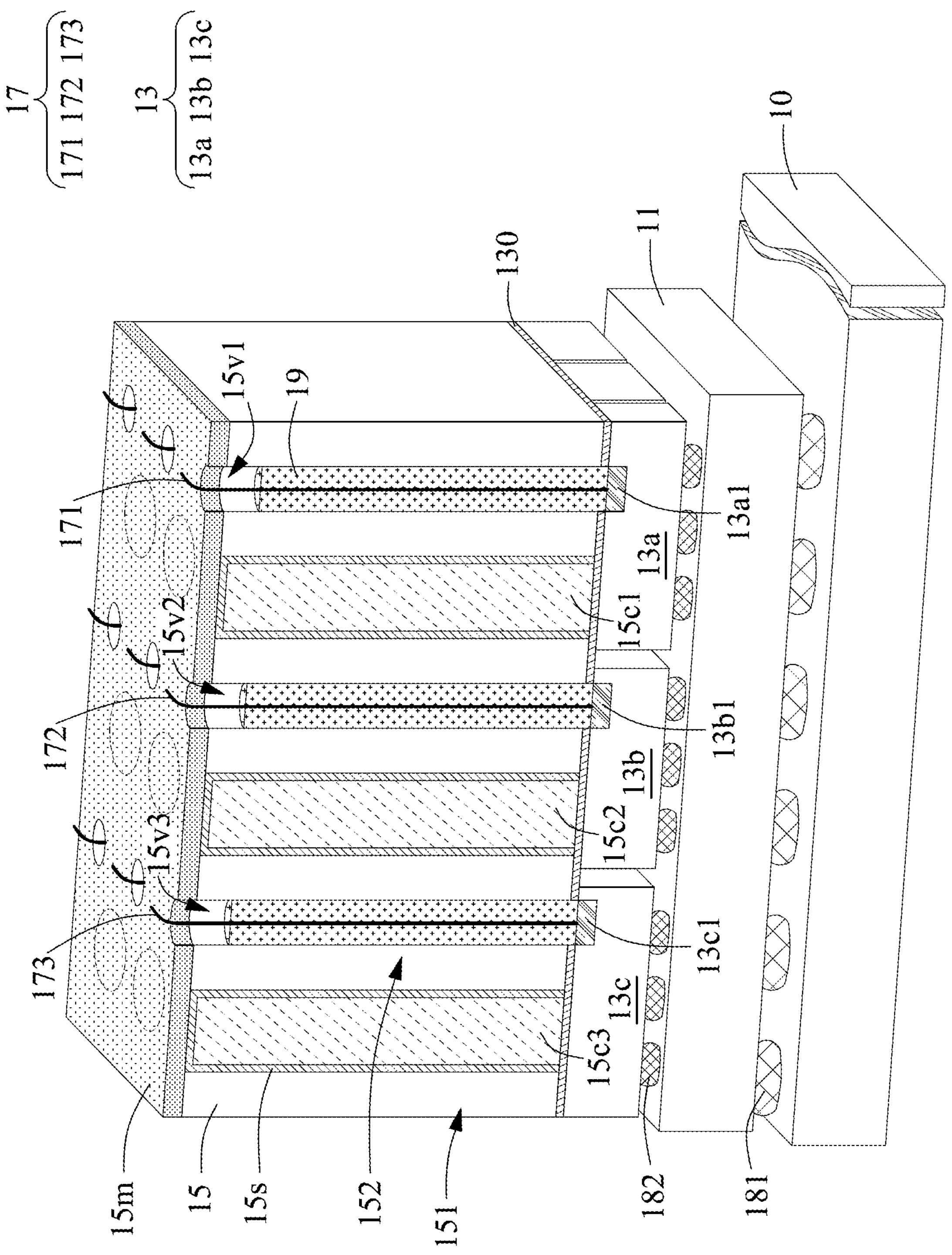

In FIG. 2H, a filler may be formed in the through vias 15*v*1, 15*v*2, and 15*v*3 to fasten or secure the optical fibers 171, 172, and 173 of a fiber array unit 17. As such, the location offset of the optical fibers 171, 172, and 173 can be prevented.

Figure 3:
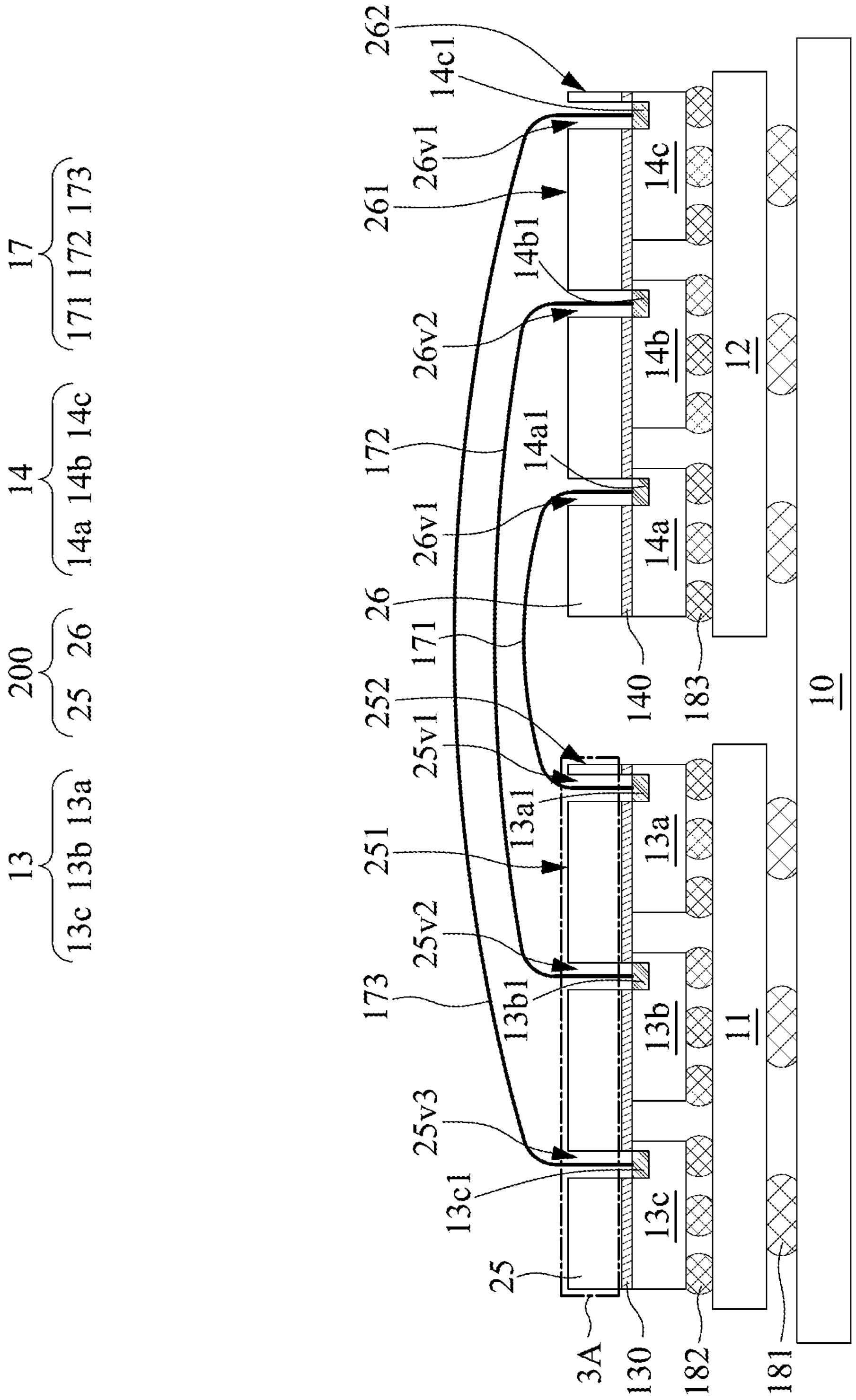
FIG. 3 is a cross section of a package device according to some embodiments of the present disclosure.

FIG. 3 is a top view of an optical device 2 according to some embodiments of the present disclosure. The optical device 2 in FIG. 3 is similar to the package device 1 in FIG. 1. Therefore, some detailed descriptions may refer to corresponding preceding paragraphs and are not repeated hereinafter for conciseness, with differences therebetween as follows.

The optical device 2 may include a through via structure 25 disposed over the photonic components 13 and a through via structure 26 disposed over the photonic components 14. The through via structures 25 and 26 may be included in an optical interconnect structure 200. The optical interconnect structure 200 may be disposed over the photonic components 13 and 14. The optical interconnect structure 200 may be configured to dissipate heat from photonic components 13 and 14 and transmit an optical signal to or from the photonic components 13 and 14. The through via structure 25 may have a region 251 configured to dissipate heat from the photonic components 13 and a region 252 configured to transmit an optical signal (with the optical fibers 171, 172, and 173). The through via structure 26 may have a region 261 configured to dissipate heat from the photonic components 14 and a region 262 configured to transmit an optical signal (with the optical fibers 171, 172, and 173).

Unlike the through via structures 15 and 16 of the package device 1, the through via structures 25 and 26 are made of material with relatively heat transfer coefficient, such as metals including copper (Cu), gold (Au), aluminum (Al), titanium (Ti), or the like. The through via structures 25 and 26 may have a larger volume of metals to transfer heat from the photonic components 13 and 14 and thus heat transfer may be increased.

Figure 4:
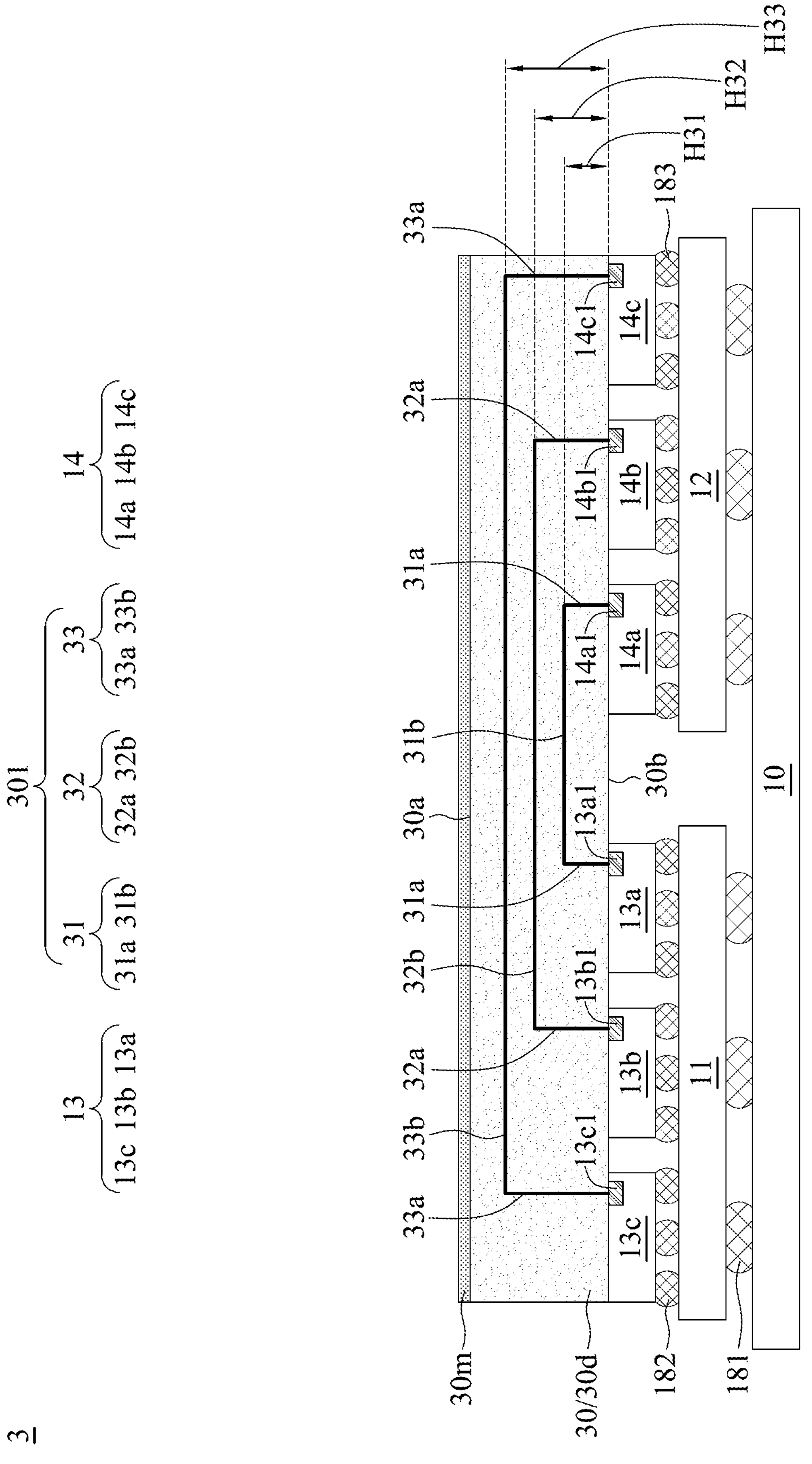
FIG. 4 is a cross section of a package device according to some embodiments of the present disclosure.

FIG. 4 is a cross section of a package device 3 according to some embodiments of the present disclosure. The package device 3 in FIG. 4 is similar to the package device 1 in FIG. 1. Therefore, some detailed descriptions may refer to corresponding preceding paragraphs and are not repeated hereinafter for conciseness, with differences therebetween as follows.

The package device 3 may include an optical interconnect structure (or through via structure) 30 disposed over the photonic components 13 and 14, instead of the optical interconnect structure 100 of FIG. 1. The through via structure 30 may have an upper surface 30*a* and a lower surface 30*b* opposite to the upper surface 30*a*. The lower surface 30*b* of the through via structure 30 may be attached to the photonic components 13 and 14. In some embodiments, a thermal interface material may be disposed between the lower surface 30*b* of the through via structure 30 and the photonic components 13 and 14.

The package device 3 may include a heat spreader 30*m* disposed over the optical interconnect structure (or the through via structure 30). The heat spreader 30*m* may include a heat dissipation layer having high thermal conductivity. The heat spreader 30*m* may cover the upper surface 30*a* of the through via structure 30 and thus present a large cross section to increase heat transfer. The heat spreader 30*m* may include solid conductors like copper, aluminum, or diamond, or may be heat pipes and vapor chambers.

The through via structure 30 may include a body portion 30*d*. The body portion 30*d* may include silicon or other suitable materials. The through via structure 30 may include a region 301 configured to transmit an optical signal from and to the photonic components 13 and 14. The region 301 may include waveguides 31, 32, and 33 embedded in a silicon block of the through via structure 30. The waveguides 31, 32, and 33 may optically couple to the optical I/O 13*a*1, 13*b*1, and 13*c*1 of the photonic components 13, respectively. The waveguides 31, 32, and 33 may optically couple to the optical I/O 14*a*1, 14*b*1, and 14*c*1 of the photonic components 14, respectively. One end of the waveguide 31 is optically coupled to the optical I/O 13*a*1, and the opposite end of the waveguide 31 is optically coupled to the optical I/O 14*a*1. One end of the waveguide 31 is optically coupled to the optical I/O 13*b*1, and the opposite end of the waveguide 31 is optically coupled to the optical I/O 14*b*1. One end of the waveguide 31 is optically coupled to the optical I/O 13*c*1, and the opposite end of the waveguide 31 is optically coupled to the optical I/O 14*c*1.

The waveguide 31 may include a vertical section (or end section) 31*a* proximal to the photonic component 13*a* and/or the photonic component 14*a*, and a horizontal section (or middle section) 31*b* connected to the vertical section 31*a* and overhanging between the photonic component 13*a* and the photonic component 14*a*. In some embodiments, waveguide 31 may include two end sections 31*a* respectively proximal to the photonic component 13*a* and the photonic component 14*a*, and the middle section 31*b* connected to the two end sections 31*a*. The vertical section 31*a* is proximal to the optical I/O 13*a*1 or the optical I/O 14*a*1. The horizontal section 31*b* may be away from the optical I/O 13*a*1 or the optical I/O 14*a*1. The vertical section 31*a* may extend vertically to the lower surface 30*b*. The horizontal section 31*b* may extend parallel to the lower surface 30*b*. An end section of a waveguide is configured to be connected to another element (e.g., a photonic component). A middle section of a waveguide is connected between a plurality of end sections.

The waveguide 32 may include a vertical section (or an end section) 32*a* proximal to the photonic component 13*b* and/or the photonic component 14*b*, and a horizontal section (or a middle section) 32*b* connected to the vertical section 32*a* and overhanging between the photonic component 13*b* and the photonic component 14*b*. In some embodiments, waveguide 32 may include two end sections 32*a* respectively proximal to the photonic component 13*b* and the photonic component 14*b*, and the middle section 32*b* connected to the two end sections 32*a*. The vertical section 32*a* is proximal to the optical I/O 13*b*1 or the optical I/O 14*b*1. The horizontal section 32*b* may be away from the optical I/O 13*b*1 or the optical I/O 14*b*1. The vertical section 32*a* may extend vertically to the lower surface 30*b*. The horizontal section 32*b* may extend parallel to the lower surface 30*b*.

The waveguide 33 may include a vertical section (or an end section) 33*a* proximal to the photonic component 13*c* and/or the photonic component 14*c*, and a horizontal section (or a middle section) 33*b* connected to the vertical section 33*a* and overhanging between the photonic component 13*c* and the photonic component 14*c*. In some embodiments, waveguide 33 may include two end sections 33*a* respectively proximal to the photonic component 13*c* and the photonic component 14*c*, and the middle section 33*b* connected to the two end sections 33*a*. The vertical section 33*a* is proximal to the optical I/O 13$c$1 or the optical I/O 14$c$1. The horizontal section 33$b$ may be away from the optical I/O 13$c$1 or the optical I/O 14$c$1. The vertical section 33$a$ may extend vertically to the lower surface 30$b$. The horizontal section 33$b$ may extend parallel to the lower surface 30$b$.

The waveguides 31, 32, and 33 in the region 301 may be configured to optically couple the photonic components 13 and 14. A plurality of optical paths between the photonic components 13 and an external device may be established in the region 301. A plurality of optical paths between the photonic components 14 and an external device may be established in the region 301. Furthermore, the photonic components 13 may be configured to optically communicate with the photonic components 14 through the region 301 of the through via structures 15 and 16.

In some embodiments, the region 301 of the through via structure 30 is configured to guide an optical signal and couple to the optical I/O 13$a$1 of the photonic component 13$a$ or the optical I/O 14$a$1 of the photonic component 14$a$. One end of the waveguide 31 is optically coupled to the optical I/O 13$a$1, and the opposite end of the waveguide 31 is optically coupled to the optical I/O 14$a$1.

In some embodiments, the region 301 of the through via structure 30 is configured to guide an optical signal and couple to the optical I/O 13$b$1 of the photonic component 13$b$ or the optical I/O 14$b$1 of the photonic component 14$b$. One end of the waveguide 32 is optically coupled to the optical I/O 13$b$1, and the opposite end of the waveguide 32 is optically coupled to the optical I/O 14$b$1.

In some embodiments, the region 301 of the through via structure 30 is configured to guide an optical signal and couple to the optical I/O 13$c$1 of the photonic component 13$c$ or the optical I/O 14$c$1 of the photonic component 14$c$. One end of the waveguide 33 is optically coupled to the optical I/O 13$c$1, and the opposite end of the waveguide 33 is optically coupled to the optical I/O 14$c$1.

In the present disclosure, the heat spreader 30$m$ of relatively high heat transfer coefficient can efficiently dissipate heat from the package device 3. Each of the photonic components 13 (or 14) has a direct optical transmission path defined by the region 301 of the through via structure 30. The through via structure 30 may be a bridge die configured to optically connect the photonic components 13 and 14. The transmission speed and the power consumption can be improved.

The waveguide 31 may have a height H31 defined by the horizontal section 31$b$ and the lower surface 30$b$. The waveguide 32 may have a height H32 defined by the horizontal section 32$b$ and the lower surface 30$b$. The waveguide 33 may have a height H33 defined by the horizontal section 33$b$ and the lower surface 30$b$. The height H31 may be less than height H32. In other words, the vertical section 31$a$ of the waveguide 31 is shorter than the vertical section 32$a$ of the waveguide 32. The height H32 may be less than the height H33. In other words, the vertical section 32$a$ of the waveguide 32 is shorter than the vertical section 33$a$ of the waveguide 33. The adjacent photonic components 13$a$ and 14$a$ may be optically connected through the waveguide 31 with the lower height H31. The non-adjacent photonic component 13$b$ and 14$b$ (or the photonic component 13$c$ and 14$c$) may be optically connected through the waveguide 32 (or 33) with the higher height H32 (or H33). The waveguides 31, 32, and 33 are distant from each other, such that optical signals transmitted therebetween will not interfere. In other words, the waveguides 31, 32, and 33 may be optically isolated from each other.

The optical interconnect structure (or the through via structure) 30 with the waveguides 31, 32, and 33 may be smaller (or thinner) than optical fibers. Overall height of the through via structure 30 may be reduced.

Figure 4A:
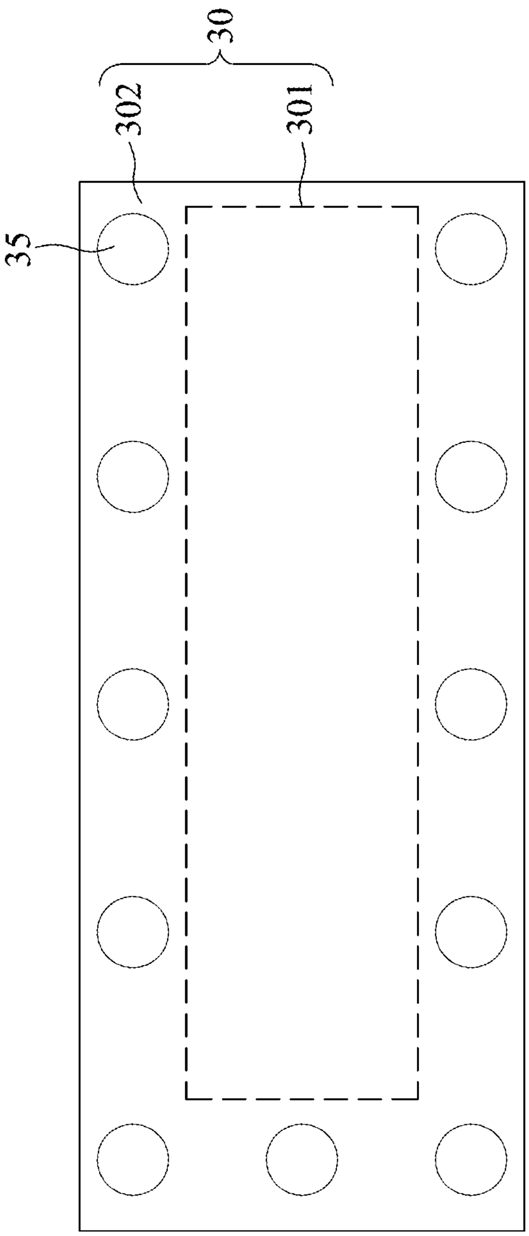
FIG. 4A is a top view of a through via structure according to some embodiments of the present disclosure.

FIG. 4A is a top view of a through via structure (e.g., the through via structure 30) according to some embodiments of the present disclosure.

The through via structure 30 may further include a region 302 configured to dissipate heat, e.g., from the photonic components 13 and 14. The region 301 may be surrounded by the region 302 of the first through via structure from a top view. The through via structure 30 may include a plurality of through vias (or through silicon vias) 35 in the region 302. The through vias 35 may be filled with material having a heat transfer coefficient greater than that of the through via structure 30 (e.g., silicon of the body portion 30$d$). In some embodiments, the through vias 35 may include one or more metal, such as copper (Cu), gold (Au), aluminum (Al), titanium (Ti), or the like.

In the present disclosure, the through via structures 30 have the heat dissipation region 302 and the optical transmission region 301 which accommodate the waveguides 31, 32, and 33. As such, the through via structure 30 with the region 302 of relatively great heat transfer coefficient can efficiently dissipate the heat from the package device 3 (or the photonic components 13 and 14). Each of the photonic components 13 (or 14) has a direct optical transmission path defined by the region 301 of the through via structure 30. The transmission speed and the power consumption can be improved and the heat transfer rate can be comparable to a bulky heat spreader.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A package device, comprising:

a first die having a first optical I/O;

a first through via structure over the first die, wherein a first region of the first through via structure is configured to dissipate heat from the first die and a second region of the first through via structure is configured to transmit an optical signal to or from the first optical I/O; and a first waveguide embedded in the first through via structure and comprising a vertical section proximal to the first optical I/O and a horizontal section away from the first optical I/O.

2. The package device of claim 1, further comprising:

a first substrate supporting the first die; and a second substrate supporting a second die having a second optical I/O, wherein one end of the first waveguide is optically coupled to the first optical I/O, and an opposite end of the first waveguide is optically coupled to the second optical I/O.

3. The package device of claim 2, further comprising:

a third die having a third optical I/O and supported by the first substrate, the third die being further from the second substrate than the first die;

a fourth die having a fourth optical I/O and supported by the second substrate, the fourth die being further from the first substrate than the second die; and a second waveguide embedded in the first through via structure, wherein one end of the second waveguide is optically coupled to the third optical I/O, and an opposite end of the second waveguide is optically coupled to the fourth optical I/O, and wherein the first waveguide is optically isolated from the second waveguide.

4. The package device of claim 1, further comprising:

a second die adjacent to the first die and below the first through via structure, wherein two end sections of the first waveguide are respectively proximal to the first die and the second die, and wherein the horizontal section connects the two end sections and overhangs between the first die and the second die.

5. The package device of claim 4, further comprising a heat spreader thermally coupled to an upper surface of the first through via structure.

6. The package device of claim 4, wherein the second region is surrounded by the first region from a top view and wherein the first region comprises a plurality of through vias filled with material having a heat transfer coefficient greater than that of the first through via structure.

7. A package device, comprising:

a first die having a first optical I/O;

a first through via structure over the first die, wherein a first region of the first through via structure is configured to dissipate heat from the first die and a second region of the first through via structure is configured to transmit an optical signal to or from the first optical I/O; and an optical transmissive material accommodated by the second region, wherein the optical transmissive material comprises a first part covered by a filler and a second part exposed by the filler and comprising a first section surrounded by the second region and a second section protruding from the second region.

8. A package device, comprising:

a first die having a first optical I/O;

a first through via structure over the first die, wherein a first region of the first through via structure is configured to dissipate heat from the first die and a second region of the first through via structure is configured to transmit an optical signal to or from the first optical I/O;

a second die adjacent to the first die and below the first through via structure;

a first optical fiber penetrating through the second region and optically coupled to the first die; and a second optical fiber penetrating through the second region and optically coupled to the second die.

9. The package device of claim 8, wherein the first through via structure fully covers the first die and the second die from a top view.

10. The package device of claim 8, wherein a first loop height of the first optical fiber is less than a second loop height of the second optical fiber and wherein the first optical fiber is optically isolated from the second optical fiber.

* * * * *